(12) United States Patent
Hamalainen

(10) Patent No.: US 8,184,801 B1
(45) Date of Patent: May 22, 2012

(54) ACOUSTIC ECHO CANCELLATION FOR TIME-VARYING MICROPHONE ARRAY BEAMSTEERING SYSTEMS

(75) Inventor: Matti Hamalainen, Lempaala (FI)

(73) Assignee: Nokia Corporation, Espoo (FI)

( * ) Notice: Subject to any disclaimer, the term of this patent is extended or adjusted under 35 U.S.C. 154(b) by 1328 days.

(21) Appl. No.: 11/824,161

(22) Filed: Jun. 28, 2007

Related U.S. Application Data

(60) Provisional application No. 60/932,981, filed on Jun. 29, 2006.

(51) Int. Cl.
  *H04M 9/08* (2006.01)
(52) U.S. Cl. .................. 379/406.03; 381/94.3
(58) Field of Classification Search ............ 379/406.03; 381/94.3
  See application file for complete search history.

(56) References Cited

U.S. PATENT DOCUMENTS

| | | | |
|---|---|---|---|
| 5,305,307 A * | 4/1994 | Chu | 370/288 |
| 2005/0141731 A1 * | 6/2005 | Hamalainen | 381/94.3 |
| 2006/0239443 A1 * | 10/2006 | Oxford et al. | 379/406.01 |

FOREIGN PATENT DOCUMENTS

EP  1 184 676 A1  3/2002

OTHER PUBLICATIONS

S. Haykin, "Adaptive Filter Theory", Prentice Hall, New Jersey, 1996, pp. 364-507.
Kellerman W. L.: "Acoustic Echo Cancellation for Beamforming Microphone Arrays. In Microphone Arrays", Eds. Branstein M., Ward D. Springer-Verlag, New York, 2001.
W. Herbordt, W. Kellermann, and S. Nakamura : "Joint Optimization of LCMV Beamforming and Acoustic Echo Cancellation", Proc. EURASIP European Signal Processing Conference (EUSIPCO), Vienna, Austria, Sep. 2004.
W. Herbordt, W. Kellermann, "Limits for Generalized Sidelobe Cancellers with Embedded Acoustic Echo Cancellation", Proc. IEEE Int. Conf. on Acoustics, Speech, and Signal Processing (ICASSP), Salt Lake City, May 2001.
Kajala M. and Hämäläinen M., "Filter-and-sum Beamformer with Adjustable Filter Characteristics", In Proceedings of IEEE International Conference on Acoustics, Speech and Signal Processing, Jul. 2001.

* cited by examiner

*Primary Examiner* — Alexander Jamal
(74) *Attorney, Agent, or Firm* — Harrington & Smith

(57) ABSTRACT

In a mobile terminal device having a processing unit and a memory unit, an acoustic echo cancellation and a microphone beamforming are provided. Said device includes a plurality of a microphones, a pre-processing stage has an amplifier and a signal converter for an analog-to-digital conversion. In a main signal processing stage, a pre-filter suitable for polynomial beamforming, an acoustic echo cancellation stage and a post-filter for polynomial beamforming are provided. Furthermore, a post-processing stage has an amplifier and a signal converter for a digital-to-analog conversion, and plurality of speakers.

38 Claims, 12 Drawing Sheets

ACOUSTIC ECHO CANCELLATION FOR TIME-VARYING MICROPHONE ARRAY BEAMSTEERING SYSTEMS

CROSS REFERENCE TO RELATED APPLICATIONS

This patent application claims priority under 35 U.S.C. §119(e) from Provisional Patent Application No. 60/932,981 filed Jun. 29, 2006, which, in accordance with a Request For Conversion Under 37 C.F.R. §1.53(c)(2) filed on Jun. 14, 2007, was converted from U.S. patent application Ser. No. 11/479,241, filed Jun. 29, 2006, the disclosure of which is incorporated by reference herein in its entirety.

AREA OF THE INVENTION

The present invention generally relates to a cancellation of an acoustic signal, for example a cancellation of an acoustic echo or feedback frequencies in a room and to a beamforming (including beam steering), for a plurality of microphones, for example an array of microphones, for example in mobile communications.

BACKGROUND OF THE INVENTION

Echo cancellation and beamforming can be used almost everywhere in signal processing. It may be noted that these are active research topics which are of interest in mobile communications, but also in other models of a transmission channels in the widest sense.

Currently, beamforming using several microphones has been mainly utilized for example in military, for example in radar applications for target finding or in phased arrays also named beam steering, intelligence, and professional teleconference or videoconference applications. Aforesaid applications can be usually characterized by high system costs in conjunction with relatively low manufacturing volumes.

Currently, the first low cost consumer products for mobile communication applying microphone arrays and advanced audio processing using signal processing hardware or software, for example a digital signal processor system having memory or a dedicated integrated circuit, for example using very large scale integration, enter the market.

Basically, algorithms for Acoustic Echo Cancellation (AEC) systems model a dynamically changing acoustic echo path from the loudspeaker to the microphone using an adaptive filter. There are many different algorithms and methods proposed to implement acoustic echo cancellation systems (see S. Haykin, "Adaptive Filter Theory", Prentice Hall, N.J., 1996), but such systems all have the common objective to estimate the transfer function of the acoustic echo path.

Communication systems are typically used by people in a time varying acoustic environment. Especially with portable communication devices, where the user moving and handling the device, user's movements in the vicinity of the active acoustic transducers (microphone and loudspeaker) can introduce radical changes in the echo path. Since the acoustic echo path can change in time, also the Acoustic Echo Cancellation (AEC) filters are designed to be adaptive in time.

Adaptive AEC filters, by definition, require some adaptation time, for the estimation of the transfer functions based on the available history of the input data. In addition to the theoretical maximum adaptation speed of the adaptive filter also other time varying changes in the operation conditions, such as changes in near-end speech activity or noise environment, can slow down the AEC algorithm in reaching a good model of the acoustic echo path. Therefore, AEC algorithms are not able to recover from sudden changes in the echo path instantaneously causing temporary echo leakage to the AEC output. This residual echo at the AEC output can cause additional problems such as audible echo, uplink signal distortions, and interferences for background noise reduction algorithms or even howling.

For full-duplex communication, the performance of the adaptive echo cancellation is heavily dependent on the accuracy of the linear echo path model. A good linear echo cancellation will enable simultaneous two-way communication without the need for significant residual echo suppression. Nonlinear signal suppression is the common approach in acoustic echo control systems to achieve sufficiently high echo level reduction. There are also some standards that set some limits to the echo cancellation performance e.g. ITU-T G.165.

One of the key steps towards full-duplex communication is to improve the performance of the AEC system. The AEC comes easier, if the microphone can always be placed close to the desired source (e.g. user's mouth) and the loudspeaker is placed far away from the microphone in fixed transducer locations. In the best situation all time variant changes (moving people) would be minimized so that after the initial adaptation in the beginning of the call, there would be no need for echo path model adaptation. Unfortunately, however, all of these requirements are in conflict with the product requirements of the typical mobile devices and their typical usage.

Therefore, more robust algorithms and methods are needed to improve the desired signal pickup and AEC processing in a very challenging environment with disturbances and unpredictable acoustic changes. One potential method for improving the desired signal capture from a distance is to replace the microphone with a directional microphone or an array of microphones. Integration of AEC algorithms and multi-microphone beamforming algorithms is not a trivial task, since both of these algorithms can be time varying (adaptive), which can lead to a situation where the AEC operation becomes dependent on beamforming filter operation and vice versa.

A straightforward low complexity integration of a single channel AEC with multi-microphone system leads to an approach, where the beamforming filter is first applied to the multi-channel microphone signal and second the AEC filter is applied to the single channel uplink signal at the output of the beamforming filter.

However, if the beamforming filter supports beam steering, dynamic steering will also change the echo path from the loudspeaker signal to the beamforming filter output signal and in this way disturb the AEC adaptation. Although the integration of multi-microphone beamforming and AEC technologies have been studied in the literature, so far dynamic beam steering has not been studied in detail. Aforesaid phenomenon is also present in the current multi-microphone beamforming car hands-free product HF-6W of the applicant.

Several prior art technologies have been proposed to integrate AEC with time-invariant beamforming without any technical problems. But, the practical situation changes significantly when the AEC is used with time-varying beamforming front-end.

The problem arises from the fact that when the multi-microphone beamforming (MMBF) filter is changed (steered from one direction to another) this will also change the transfer function of the echo path. Sudden echo path change implies that the AEC filter will have an imprecise model of the echo path and this will increase the echo signal leakage through the AEC filter.

The AEC adaptation will correct the model and this way tries to reduce the residual echo level. For example, MMBF beam steering can cause an instantaneous change by 180 degrees in the microphone array look direction from looking away from the loudspeaker to looking towards the loudspeaker. This type of radical change can cause significant changes in the residual echo level as well as significant changes in the dominating room reflections.

For example, let us consider a teleconference application where multiple persons use the same device in the same acoustic space. In this situation beamforming technologies can provide significant improvement in the uplink signal-to-noise ratio (SNR) when the beam is steered towards the active speaker. This type of automatic active source detection and beam steering technology could easily introduce situations where the changes in beam directivity can be instantaneous, unpredictable, and frequent in time. If the AEC processing is applied to the MMBF output signal then also the AEC algorithm would be forced to track instantaneous, unpredictable and frequent echo path changes.

The degree of echo path variability caused by the dynamic beam steering in joint MMBF-AEC operation can be influenced with appropriate industrial design (large microphone-to-loudspeaker distance), appropriate microphone directivity control (low microphone sensitivity towards the loudspeaker), and possible MMBF steering controlled AEC adaptation methods. However, the fundamental conflict in requirements of dynamically steered MMBF and adaptation of AEC algorithms cannot be sufficiently avoided without proper arrangement of the AEC processing. In order to avoid this problem completely the AEC processing should be applied to the microphone signal path before the time-varying MMBF processing manipulates the echo path. The only prior art approach that is known to the inventor applies dedicated AEC filters for every microphone signal before the (time varying) beamforming stage. In this case the number of AEC filters, the computational complexity, and the required runtime memory would increases linearly with the number of microphones, which can easily limit the maximum number of microphones the product can support.

In mobile applications both the end-user and the device can move and therefore a fixed speaker direction cannot be assumed. Therefore, it is necessary to estimate the direction of arrival (DOA) of the desired signal and utilize this spatial information to steer the beam pattern towards the desired source to improve the uplink SNR by attenuating the undesired signal components (noise) and undesired room reflections from the desired signal (speech). Hence, time-varying beam steering and acoustic echo cancellation are both needed for high performance mobile telephony applications utilizing MMBF technologies.

In a general case it would be very challenging to model the dynamic characteristics of the echo path changes. When each user has a different way of using the device, every acoustic space has unique reverberation characteristics, acoustic transducers have statistical variations, and all these factors tend to change in time, the echo path characteristics have an infinite number of different combinations and factors affecting the echo path statistics. Even if there were significant statistical redundancy in practical echo path models, the Applicant is unaware of any feasible transfer function prediction method that could be applied for real-time prediction of dynamic echo path changes.

Academic literature recognizes a few basic configurations how to integrate time-varying beamforming with acoustic echo cancellation (see Kellerman W. L.: "Acoustic Echo Cancellation for Beamforming Microphone Arrays. In Microphone Arrays", Eds. Branstein M., Ward D. Springer-Verlag, New York, 2001; W. Herbordt, W. Kellermann, and S. Nakamura: "Joint Optimization of LCMV Beamforming and Acoustic Echo Cancellation", Proc. EURASIP European Signal Processing Conference (EUSIPCO), Vienna, Austria, September 2004; W. Herbordt, W. Kellermann, "Limits for Generalized Sidelobe Cancellers with Embedded Acoustic Echo Cancellation", Proc. IEEE Int. Conf. on Acoustics, Speech, and Signal Processing (ICASSP), Salt Lake City, May 2001). Kellermann has (in above second citing) reviewed four alternative AEC-beamformer configurations without considering the beam steering functionality.

Partition of beamforming filter to time invariant front-end and the time varying post-filter (see EP 1184676; Kajala M. and Hämäläinen M., "Filter-and-sum Beamformer with Adjustable Filter Characteristics", In Proceedings of IEEE International Conference on Acoustics, Speech and Signal Processing, July 2001) so that the time-variant filter is following the time-invariant processing making it possible to process the intermediate signals between these two stages.

This Polynomial Beamforming Filter (PBF) is a favourable structure for applying AEC processing to the intermediate signals. The processed intermediate signals containing the microphone signals containing low level residual echo components are passed to the PBF post-filter. When the PBF post-filter is applied to the intermediate signals to steer the beam towards any direction independent of the previous AEC processing according to the prior art related to the PBF filter structure.

The proposed invention has several possible embodiments. Most of these variants are obvious from the previous IPR on PBF filtering but also multi-channel (MIMO) configuration has been considered. The beamforming system view is given in FIG. 6. These figures should be relatively easy to interpret for an expert in the field.

In all examples time-varying beamforming refers to adaptive beamformer operation where the adaptation is following statistical signal variations, like in Adaptive Interference Cancellers (AIC) and Generalized Sidelobe Cancellers (GSC). Therefore, AEC integration with dynamically steered beamformer front-end has not been considered in the extent of this invention. This is partly due to the fact that other researches have not considered the usage of the PBF (polynomial beamforming filter) structure. Also, some applications like hearing aids may keep the beam directivity fixed, because the user can adjust the directivity pattern easily by turning his/hers head towards to the sound. Moreover, in this invention the formulation of the MMBF-AEC problem is more generalized and complex compared to the existing academic literature.

An alternative approach to the steering of an independent AEC integration problem is to assign separate AEC filters for each microphone input before MMBF processing.

SUMMARY OF THE PRESENT INVENTION

One object of the present invention consists in the operation of time-varying front-end followed by an adaptive AEC filter for using in a mobile terminal device, for example.

The present invention provides a solution to the fundamental problem how to integrate AEC system with dynamically steered multi-microphone front-end without assigning a separate AEC filter for each microphone signal. All embodiments of the present invention are to be construed in a non-limiting manner.

The problem arises when the adaptive filter of the AEC system tries to model (favorably relatively time-invariant) echo path and at the same time speaker tracking function of the microphone array is changing the beamforming filter directivity causing changes in the acoustic echo path at the beamformer output. In the case of multiple near-end speakers, the direction of the active speaker can change almost instantaneously. This could lead to frequent instantaneous echo path changes in the pace of the natural conversation. The present invention addresses this problem.

The invention introduces a new algorithm structure and approach to integrate acoustic echo cancellation with time-varying multi-microphone beamforming.

The Polynomial Beamforming Filter (PBF) structure separates the time-invariant and the time-variant part of the polynomial beamforming filter. It is favourable to the invention that the time-invariant PBF stage is preceding the time-variant post-filter that is used for beam steering.

In a first aspect, a method for reducing echo and noise is provided. In another aspect a mobile terminal device having a processing and memory unit for providing an acoustic echo cancellation and a micro-phone beamforming is provided. In a further aspect, a beamforming system for a mobile terminal device is provided. In another aspect, a client and a server in a client-server network suitable for acoustic echo cancellation are provided. In a fourth aspect, a module of a beamforming system is provided; a signal processor is provided; a semiconductor integrated circuit is provided; an electronic musical instrument for entertainment is provided; a night sight radar having a phased array of antennas is provided; a sonar array for acoustic imaging system is provided; a microphone system having a plurality of microphones is provided; a mixing console having a plurality of symmetrical inputs is provided; a computer program product is provided; a software plug-in is provided; a data structure is provided; a computer readable medium is provided; and a modulated data signal, computer data signal or spectral signature embodied in a carrier wave is provided.

Further aspects of the invention result from the dependent claims, from the following description and from the drawings.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which is shown.

DETAILED DESCRIPTION OF THE INVENTION

Figure 1:
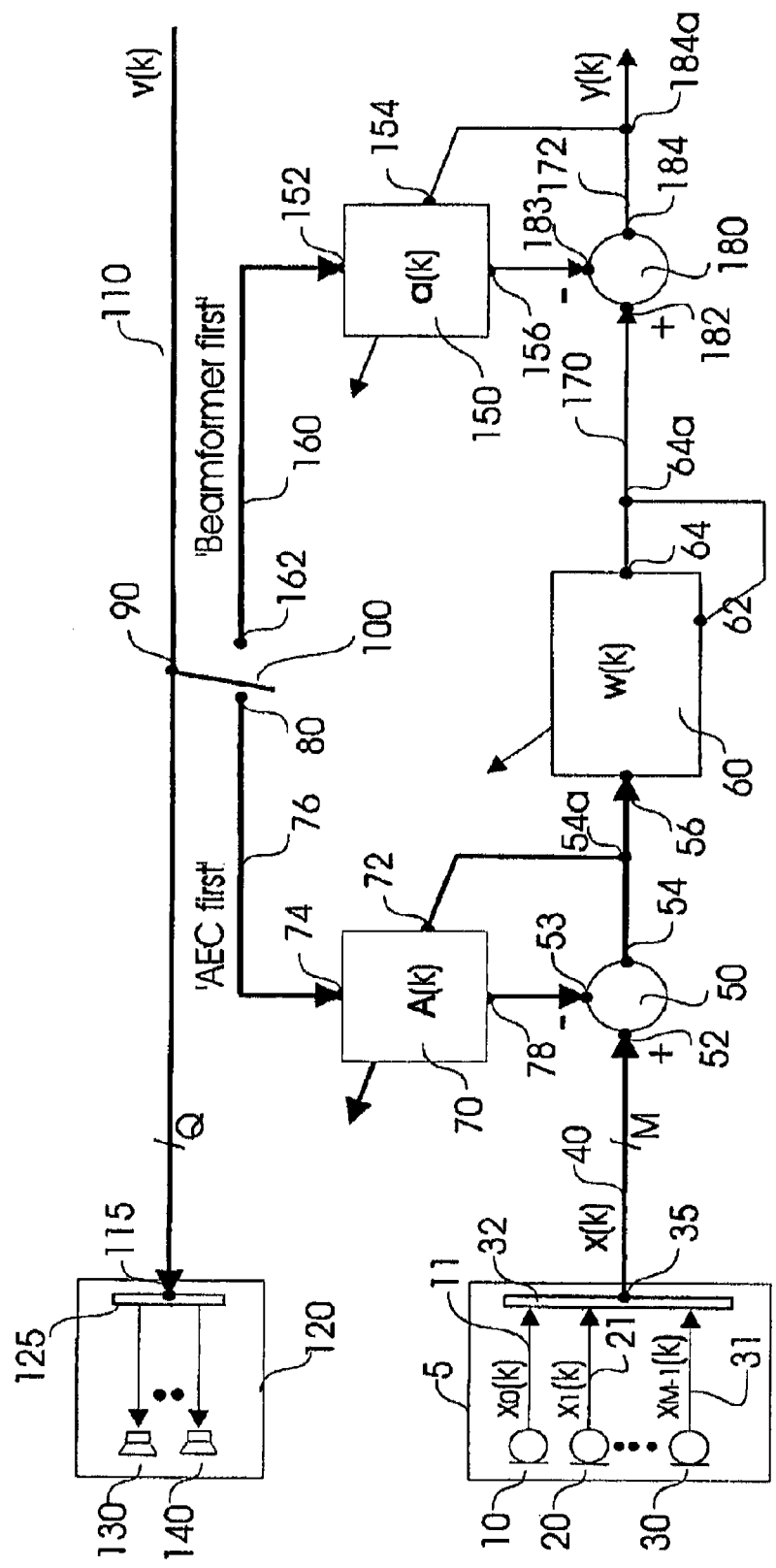
FIG. 1 a conventional AEC MMBF integration system with two alternative configuration: 'Beamformer first' and 'AEC first'.

FIG. 1 illustrates an AEC MMBF integration option in a configuration of prior art.

An M channel AEC filtering is placed before beamforming, this configuration being called 'AEC first'. The configuration of the system is as follows:

On the input side, there is an input block 5 provided for comprising a plurality of microphones 10, 20, 30. Furthermore, a block 60 for adaptive beamformer w(k), a block 70 for AEC processing A(k). In the 'AEC first' configuration, a input 162 is disconnected and a block 150 for alternative AEC filtering a(k) is not active and therefore there is no signal in a output 156. Said block 60 for beamforming a first input 56, a second input 62 and an output 64. Said block 70 for AEC processing has a first input 74, a second input 72 and an output 78.

Also, a first operation member 50 is provided having a first input 52, a second input 53 and an output 54. A second operation member 180 having a first input 182, a second input 183 and an output 184 is provided. Said output signal is denoted by y(k).

Also a bus 110 is provided which has a node 90 connected to a switchable element 100 for providing a switch function. Said bus 110 passes a downlink signal v(k) to a loudspeaker system 120 and has Q channels. On the output side, there is said output block 120 having loudspeakers 130 . . . 140 and an output mixing unit 125 for routing the audio signals to the said loudspeakers. Said mixing unit 125 has a node 115.

Now, the input block 5 having said array of microphones 10, 20 and 30 forms an input array. Corresponding to said microphones 10, 20, 30, individual microphone signals $x_0(k)$, $x_1(k), \ldots x_{M-1}(k)$, respectively, are created; M is the number of microphones present on said input side 5.

Said block 60 for adaptive beamforming has a function w(k); said block 70 for AEC processing has a function A(k). Bold face typing signifies that said functions w(k), A(k) and a(k) are vectorial or matrix functions.

Note that, and valid for the whole application, the arrows coming out open-ended at the left side of block 60, 70 and 150 for example, may designate that said functions may be for example variant to parameters using a known schematic symbol in a sense of a resilient potentiometer. But here said functions are similar to or represent a plurality of functions affected simultaneously or in parallel, having multiple degrees of freedom, be self-modifying, or just like doing realtime Monte-Carlo-Simulation at least in any combination possible.

Said input block 5 has also an input mixing unit 32 which is connected to said microphones 10, 20 and 30 via connections 11, 21 and 31, respectively. Said mixing unit has a node 35 which is connected to the beginning node of a bus 40 having M channels. In a typical configuration said mixing units routes microphone signals 11 . . . 31 to desired M audio channels of said bus 40 without an introduction of signal cross-talk. Said bus 40 passes the M channel microphone signal x(k) for processing. x(k) represents the vector of said individual microphone signals $x_0(k), x_1(k), \ldots x_{M-1}(k)$. Said bus 40 is connected at the end to said first input 52 of said operation member 50. Said output 54 of said operation member 50 is connected with said input 56 of said adaptive beamforming filter 60. Also, said output 54 is also branch-connected at node 54a with said first input 72 of said block 70 for AEC processing.

Said second input 74 of block 70 is connected to a bus 76 having a node 80. Node 80 is connectable to said node 90 via a releasable connection 100 providing a switchable element. Said output 78 of said block 70 is connected to said second input node 53 of the operation member 50. Said output 64 of said block 60 is directly feed-back via node 64a to said second input node 62 of block 60, and said output 64 is also connected to said input node 182 of said operation member 180 via a connection 170.

When an adaptive beamforming filtering 60 is processed before the AEC filtering, in so called 'Beamformer first' configuration, a switchable element 100 is disconnected from a input 80. In this configuration an alternative AEC processing A(k) in 70 becomes inactive as there is no audio signal in input 74 and output 78. In the Beamformer first' configuration the AEC processing block A(k) 70 can be ignored.

In said 'Beamformer first' configuration, said first operation member 50 is provided having said first input 52 and said second input 53 is inactive and does not influence on said output 54. Said second operation member 180 having a first input 182, a second input 183 and an output 184 is provided. Said output signal is denoted by y(k).

In said configuration said first input 152 of said AEC processing a(k) block 150 is connected with a bus 160, wherein said bus 160 has a node 162. Node 162 is connected to said node 90 via a releasable connection 100, said switchable element. Thus, said switching element can implement switching between said two configurations by moving the releasable connection 100 between node 80 and node 162.

Also, said output 156 of block 150 is connected with the second input 183 of operation member 180. The output of operation member 180 is connected with the second input 154 of block 150 via a node 184 on a connection 172.

To summarize the microphone signal processing order in said configurations. In the 'AEC first' configuration, M channel AEC processing is applied to the microphone signal before the MMBF processing. This means that every microphone signal has its own AEC filter and the MMBF input should have only small level of remaining residual echo. This configuration separates the AEC from the MMBF beam steering at the cost of M parallel adaptive AEC filters. As the AEC processing load increases linearly with the number of microphones, 'AEC first' implementations become unfeasible for commercial consumer products, when the number of microphones becomes large.

In the 'Beamformer first' configuration, adaptive beamforming is applied to the microphone signal before the AEC processing applied to the microphone signals x(k). In this configuration AEC processing is disturbed by dynamic beam steering.

As a third alternative MMBF-AEC configuration, the dynamic beam steering could be replaced by a large number of fixed time-invariant beamforming filters looking at all different look directions. In this configuration a dedicated AEC processing is applied to the output of each beamforming filter with a fixed directivity pattern. In this configuration the AEC operation would not be affected by the MMBF processing, because the steering would be implemented with output signal selection scheme. This configuration is not very feasible in practice because high performance dynamic beam steering in 3D cannot be implemented with low number of look directions and high number of look directions would introduce a very high CPU power processing requirement.

In the future, the increase of audio bandwidth increases the need to increase the number of microphones M for the wide band MMBF systems. This trend is also supported by the low cost digital microphones, which are expected to be available in the following years. With this approach, the available CPU performance could limit the maximum number of microphones and the performance the commercial products could achieve. This may be especially the case when CPU resources are limited or the product designer wants to minimize the CPU cost by selecting an inexpensive low performance CPU.

It is desirable to minimize the number of parallel AEC filters, because adaptive modeling of a typical room impulse response requires long AEC filters especially with high audio sampling rates. In the 'AEC first' the needed CPU power would increase linearly with the increasing number of microphones.

Figure 2:
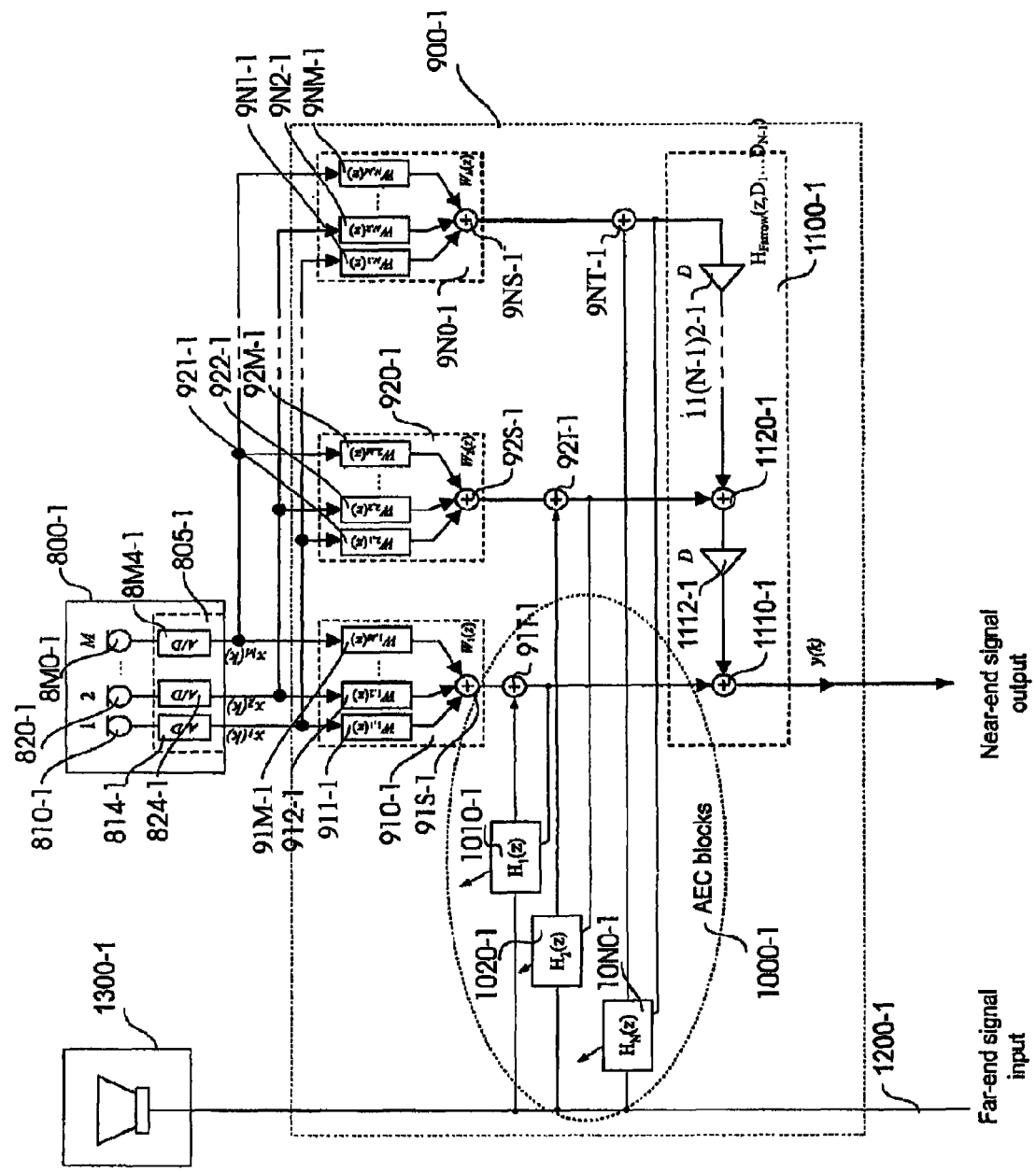
FIG. 2 an AEC integration to time-varying PBF beamformer front-end according to a first embodiment of the present invention having monophonic signals and single look direction at the time.

A more practical MMBF-AEC system configuration without time-varying beam steering functionality disturbing the AEC performance is illustrated in FIG. 2. Aforesaid illustration is using time-invariant filter-and-sum FBF front-end commonly used in the textbook implementation of the Generalized Sidelobe Canceller (GSC) beamforming solutions.

An embodiment of the invention, as illustrated in FIG. 2, shows that the AEC processing can be connected to the intermediate signals of the PBF. The fixed M-channel FIR filters $W_i(z)$ of the PBF front-end do not change the echo path and therefore the beam steering processing taking place at the post-filter $H_{Farrow}(z,D)$ will not be affected the AEC echo path model. In the literature the PBF filter structure is also known as a Farrow structure. Farrow (1988) proposed a fractional delay FIR filter structure where every coefficient of an FIR filter could be expressed as an Nth order polynomial in the delay parameter D. The PBF filter structure, illustrated in FIG. 2, is obtained when the polynomial is evaluated using Horner's rule, which leads to a Taylor polynomial approximation of an ideal beamforming filter. Even if the Taylor polynomial has been applied in the illustrations of this invention, this invention is not limited by the applied polynomial basis functions. E.g. the Chebyshev polynomials have the advantage of limiting the required dynamic range of pre-filter $W_i(z)$ coefficient.

The configuration of the system according to FIG. 2 is described having the following components. At the input side, there is an input block 800-1 provided for comprising a plurality of microphones 1 to M, where M is a number of channels (matching in this embodiment with the number of microphones), exemplarily shown as 810-1, 820-1, 8M0-1 and a pre-processing stage 805-1. Note that the nomenclature of reference signs reflects the respective channels insofar.

In said pre-processing stage 805-1, a plurality of amplifiers may be provided (not shown, but would be named 812-1, 822-1, 8M2-1). As to said amplifiers, they may comprise typical additional circuits suitable for example for a signal conditioning, like input-matching, amplitude limiting, compression, adaptive automatic gain control, adaptive bandwidth selection, parametric or adaptive equalising, ground lifting, phase inversion or shifting, symmetrical, non-symmetrical or differential input, phantom voltage, muting.

Said amplifiers may comprise a processor or an interface, for example $I^2C$-bus, suitable for programming parameters, for example gain, bandwidth, frequency response, each having a resolution and may be clocked or scanned in junction with a sample/hold stage or a signal conversion.

Furthermore, said pre-processing stage 805-1 comprises a plurality of signal converters, said converters are suitable for an analog-to-digital conversion, for example by a pulse code modulation using at least a bit, an oversampling, a decimation filter, noise or spectral shaping. Note that analog-to-digital conversion may be done also by a digital-to-analog converter.

Said signal converter block 805-1 can be formed of an arrangement of individual A/D-Converters 814-1, 824-1, 8M4-1, as shown in FIG. 1; alternatively, said converters can be formed as an array converter, for example a monolithic semiconductor device having a plurality of inputs. Also, one converter can process multiple channels having a multiplexer doing a channel scanning and providing buffers and a queuing, priority or a rule based scheme for operating or processing multiple channels.

Also, a sampling, be it equidistant or not, single- or multi-valued, including variable oversampling of every channel may be performed by a deterministic, cyclic, rule- or signal-dependent or time-variant basis using for example a index driven scanning of one to every of a plurality of channels with a sampling rate, for example, n times the bandwidth of a single channel, where n may be a number of active channels.

Note by the way, that a so-called intelligent microphone may be realised by using a signal processor right behind a sonic transducer, Antenna, doing all before-said signal conditioning features in a signal domain, by doing direct sampling without input filter. Said input stage 800 can also be substituted by an output of another signal processor delivering or passing a data structure, for example in a mobile terminal device suitable for a measurement device or an electronic musical instrument having a Musical Instruments Digital Interface.

Next, a main signal processing stage 900-1 comprises a plurality of pre-filter blocks 910-1, 920-1, 9M0-1, said blocks being suitable for pre-filtering; an AEC block 1000-1 having a plurality of N blocks 1010-1, 1020-1, 10N0-1 each capable of acoustic echo cancelling; and a post-filter 1100-1 having a plurality of N-1 operation means 1110-1, 1120-1, ... 11(N-1)0-1 as indicated in the reference sign; and having a plurality of signal amplification elements 1112-1, 1122-1, 11(N-1)2-1 for example, having N-1 elements.

Each of said pre-filters 910-1, 920-1, 9N0-1 has a first, a second, . . . , an N-th block, they have a N,M plurality of blocks, 911-1, 921-1, . . . , 9N1-1; 921-1, 922-1, . . . , 9N2-1; and 9N1-1, 9N2-1, . . . , 9NM-1; each of them having corresponding functions $W_{i,j}(z)$, $W_{2,2}(z)$, . . . $W_{N,M}(z)$, respectively, where M is said number of channels, N is the number of filters within each channel corresponding to the N-1 order polynomial of the PBF. Such a multi-dimensional filter may be named a matrix filter arrangement or an arrangement of a filter matrix.

Each of aforesaid function/s of said pre-filter/s has/have for example a beam pattern suitable for polynomial beamforming.

Said pre-filter/s may have time-invariant or time-variant filter or weighting coefficients. Besides, each coefficient in a function individually may comprise a sample/hold or a multiply-and-accumulate behaviour including compression, saturation. Aforesaid behavior may include a variable negative-exponential, a variable positive-exponential, a linear, smoother or quantised behavior so as to form adaptive or dynamic filter coefficients which may updated in a process realtime.

Also, each of said plurality of function blocks 910-1, 920-1, 9N0-1 have an individual operation member 91S-1, 92S-1, 9NS-1 (the "S" may be meaning sum) suitable for adding, merging or interleaving each output of each of said functions blocks. Each of said pre-filter block 910-1, 920-1, 9N0-1 has an associated output function $W_1(z)$, $W_2(z)$, . . . $W_M(z)$.

Note, that although $W_{i,M}(z)$ may be a time-invariant function, it can also be time variant (not shown), for example—either by doing individual feedback per channel, for example, by connecting the output of each block with the input, by providing a suitable scaling, damping or inverting element to avoid saturation, clipping, oscillation or latch-up—or by feeding back an output of the respective operation member, for example 91S-1 to each of the blocks within said pre-filter 910-1 or to any other block or any combination of said pre-filter blocks 910-1, 920-1, 9N0-1.

Each of plurality of said blocks 1010-1, 1020-1, 10N0-1 is suitable for acoustic echo cancelling, for example by providing a function $H_1(z)$, $H_2(z)$, . . . , $H_N(z)$. In said blocks, therein $H_i(z)$, where i corresponds to the respective channel i=1, 2, . . . , N; $H_i(z)$ may be for example a invariant, non-variant, variant, partly-variant, run-time-configurable variant, coefficient-quantified or approximated, direct, real-time, low latency, fast settling, reverse or inverse, a symmetric, asymmetric or antisymmetric, real or complex filter or weighting function of one or more real or imaginary dimensions.

$H_i(z)$ may be an impulse response function or distribution in the signal decomposition to the frequency domain using for example a Fourier transform or some other exact or approximated signal decomposition method such as an orthogonal transform, a lapped orthogonal transform, a Wavelet transform, or a filter bank; a spectral impulse response, a inverse function in the z-Domain or in the k-Domain, in a secret Domain, a cepstrum function, a function or a probability distribution, a variance, correlation, cross-correlation, inverse correlation, an autocorrelation function, a transcendental, higher-dimensional or non-unique function, a mapping, a memory structure, a data or spectral signal, a signature, a fragment of a memory structure or a spectrum out of dimension.

Also $H_i(z)$ may or may not obey a Parseval theorem of quadratically integrable functions or Sommerfeld radiation condition or have a smooth or non-smooth not carrier. Lastly $H_i(z)$ may contain a delta distribution, including its higher order derivatives.

The main processing stage 900-1 comprises also a post-filter for polynomial beamforming 1100-1 suitable for providing a function $H_{Farrow}(z,D)$ of beam steering network of steering parameter D, comprising signal amplification operation means 1112-1, 1122-1, ..., 11(N-1)2-1, signal combination operation means 1110-1, 1120-1, ..., 11(N-1)0-1, and signal delay operation means (not shown). Note that the beam steering network of the post-filter 1100-1 may be realised to have no or a neglectable inherent processing delay or latency.

Said beam steering network may be suitable for delay of a certain time or clock cycles. Different beam steering networks may be even time or amplitude variant, programmable or have one or a plurality of for example weighted or weighting feedback inputs including scaling, inverting etc (not shown). At the output side, generally, there is a post-processing stage (1300-1), for example having similar to the input stage 800-1 at least an amplifier (not shown) and at least one signal converter (not shown) for a digital-to-analog conversion; and more than one of a plurality of a speaker (not shown).

In this first embodiment the output section is simplified by for comprising only one speaker. But may be appreciated that the features substantiated for the input side, especially for the signal converters are also applicable for the output side.

Note that the signal converter may be a part of a signal processor or semiconductor of a type capable to output a power signal directly to a speaker, for example using a high-clocked 1 bit data signal feeding a pulse width modulation power amplifier, wherein the speaker or the frequency response of the environment may acts as reconstruction low pass.

In FIG. 2, each channel of said input block 800-1 may be connected with each pre-filter 910-1, 920-1, 9N0-1, for example, in the following way, using an algorithm of connecting like matrix-connecting as follows:
  such that a first output of said input block 800-1 having a signal $x_1(k)$ (for example a representation of a first data stream) is connected with the first input of a first pre-filter block 910-1;
  such that a second output of said input block 800-1 having a signal $x_2(k)$, assigned to a second channel, is connected with the second input of said first pre-filter block 910-1, ... and;
  such that a M-th output of said input block 800-1 having a signal $x_M(k)$, referring to the last channel, is connected with the M-th input of said first pre-filter block 910-1;
  such that a first output of said input block 800-1 having a signal $x_1(k)$ (for example a representation of a first data stream) is connected with the first input of a second pre-filter block 920-1;
  such that a second output of said input block 800-1 having a signal $x_2(k)$, assigned to a second channel, is connected with the second input of said second pre-filter block 920-1, ... and;
  such that a M-th output of said input block 800-1 having a signal $x_M(k)$, referring to the last channel, is connected with the M-th input of said second pre-filter block 920-1; and
  such that a first output of said input block 800-1 having a signal $x_1(k)$ is connected, with the first input of a N-th pre-filter block 9N0-1;
  such that a second output of said input block 800-1 having a signal $x_2(k)$, is connected with the second input of said N-th pre-filter block 9N0-1, and such that a M-th output of said input block 800-1 having a signal $x_M(k)$, referring to the last channel, is connected with the M-th input of said N-th pre-filter block 9N0-1.

Note that the foregoing example for a matrix connection may also be an example for a method for sequential processing or addressing, for example a matrix addressing method for processing the whole structure, which also can be applied reversed, or reshaped matrix form, including all operations possible with matrices.

Also, if aforesaid addressing may be performed continuously within a programming loop or a procedure, an index shifting in a circle, a index permutation or random index modulation is possible. For an example an index-rotate left of 1, 2, ... M means the order M, 2 ... 1 or 2, M ... 1).

Now, each output of each pre-filter 910-1, 920-1, ..., 9N0-1 from each operation member 91S-1, 92S-1, ..., 9NS-1 is connected to each first input of respective operation members 91T-1, 92T-1, ..., 9NT-1.

Also, the respective outputs from the AEC blocks 1000-1, namely from 1010-1, 1020-1, ... 10M0-1 are connected to each second input said operation members 91T-1, 92T-1, ..., 9NT-1, respectively, to remove the acoustic echo from the signals at the output of said operation members 91T-1, 92T-1, ..., 9NT-1, before said signals are passed to a post-filter 1100-1.

Each output of said operation members 91T-1, 92T-1, ..., 9NT-1 is feedback, respectively, to the respective input of blocks 1010-1, 1020-1, 10N0-1, which are suitable for acoustic echo cancelling or suitable for a variant function. Said feedback channels contain the information about the residual echo characteristics which is utilized in AEC filter adaptation.

Also, according to FIG. 2, each output of said signal summing operation members 91T-1, 92T-1, ..., 9(N-1)T-1 (not shown) is connected to said operation members 1110-1, 1120-1, ..., 11(N-1)0-1 (not shown) of said post-filter 1100-1, wherein the last operation member 11(N-1)0-1 combines signals received directly from said operation member 9(N-1)T-1 and a signal from 9NT-1 amplified by a amplification element 11(N-1)2-1.

In the post-filter 1100-1, each output of each amplification element is connected with the input of the operation member of next lower N, the (N-1)-th operation member, such that each amplification element and each combining operation member are connected in an alternating manner as is shown in FIG. 2. Said sequential connection may be implemented efficiently using multiply-accumulate DSP processing instructions with a common accumulator memory for the creation of the output signal $y(k)$.

The output of the first operation member 1110-1 of the post-filter 1100-1 signal $y(k)$ is a near-end signal output leaving the system and which may be connected to a network or a further processing stage (not shown). Running through said network, internet etc. an re-entering the main processing stage 900-1, an input channel 1200-1, for example, a serial bus, may connected with the far-end signal input.

The inputs of all members 1010-1, 1020-1, ..., 10N0-1 of the AEC block 1000-1 are connected with said input channel 1200-1. Said input channel 1200 is also connected to said post-processing stage 1300-1, comprising said speaker.

Figure 15:
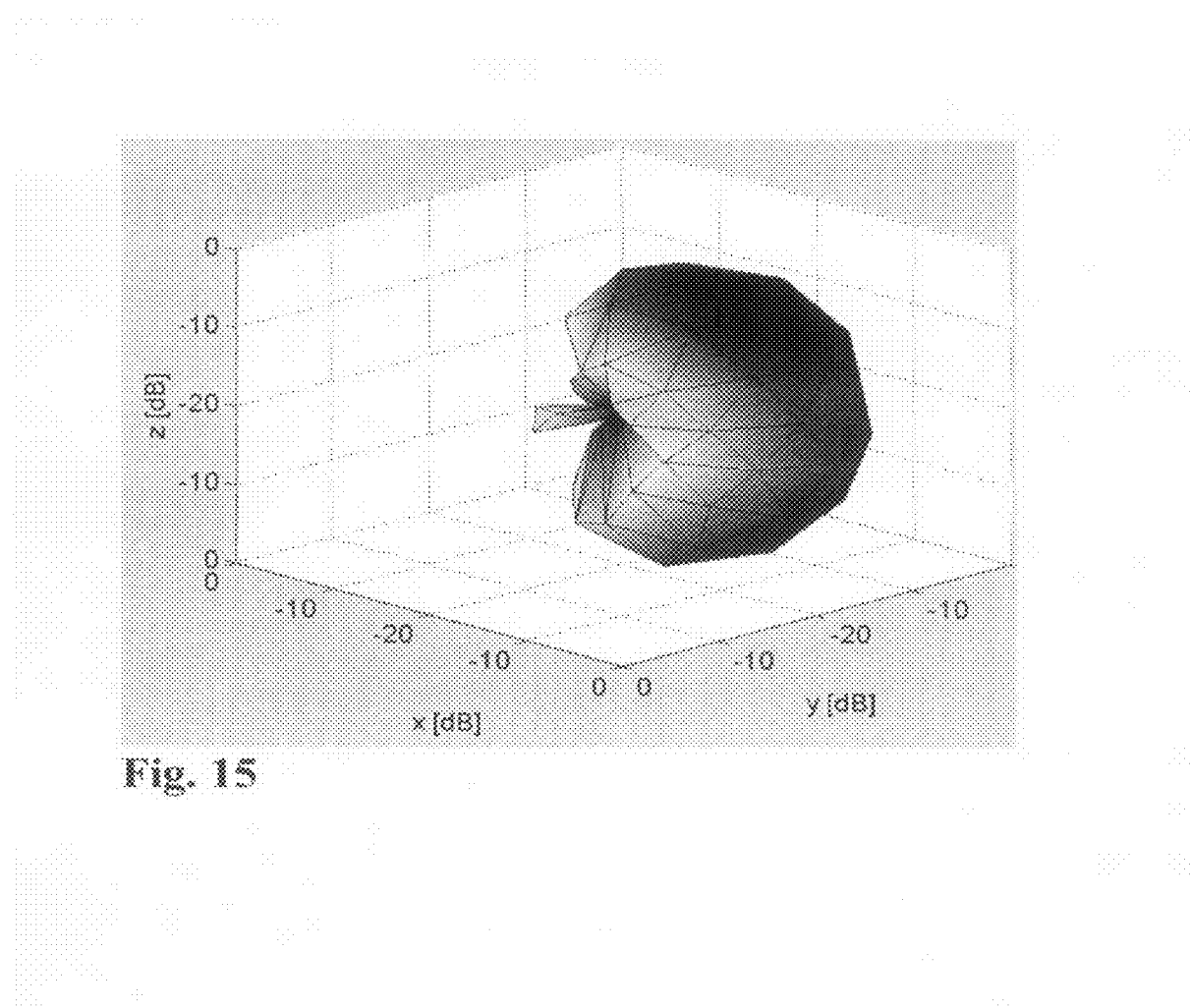
FIG. 15 an example of a beam pattern of the PBF filter for the eight microphone ring array design at 2100 Hz where the PBF beam has been steered towards the azimuth angle of 84 degrees.

The beam steering independent AEC property is comparable to AEC first configuration, but the fixed PBF front-end $W_i(z)$ enables also additional advantages for AEC operation. Each pre-filter $W_i(z)$ has a dedicated beam pattern illustrated in FIGS. 11 to 14. When said pre-filter beam patterns are combined by the post-filter the overall beam pattern of the PBF is achieved for the desired beam steering direction illustrated in FIG. 15.

In a typical product configuration the relative positions of the microphones and loudspeakers are fixed. That means that the direction of arrival for the direct sound from the loudspeaker to microphone can be estimated during the time design time of the product. It is possible to design the minimum sensitivity of the microphone array towards the dominant interfering sources i.e. the loudspeaker. Low level echo coupling has many benefits, which can be utilized e.g. by making the loudspeaker louder without the risk or howling, improve the robustness of the AEC operation and control, and improve the dynamic range of the AEC processing.

Figure 3:
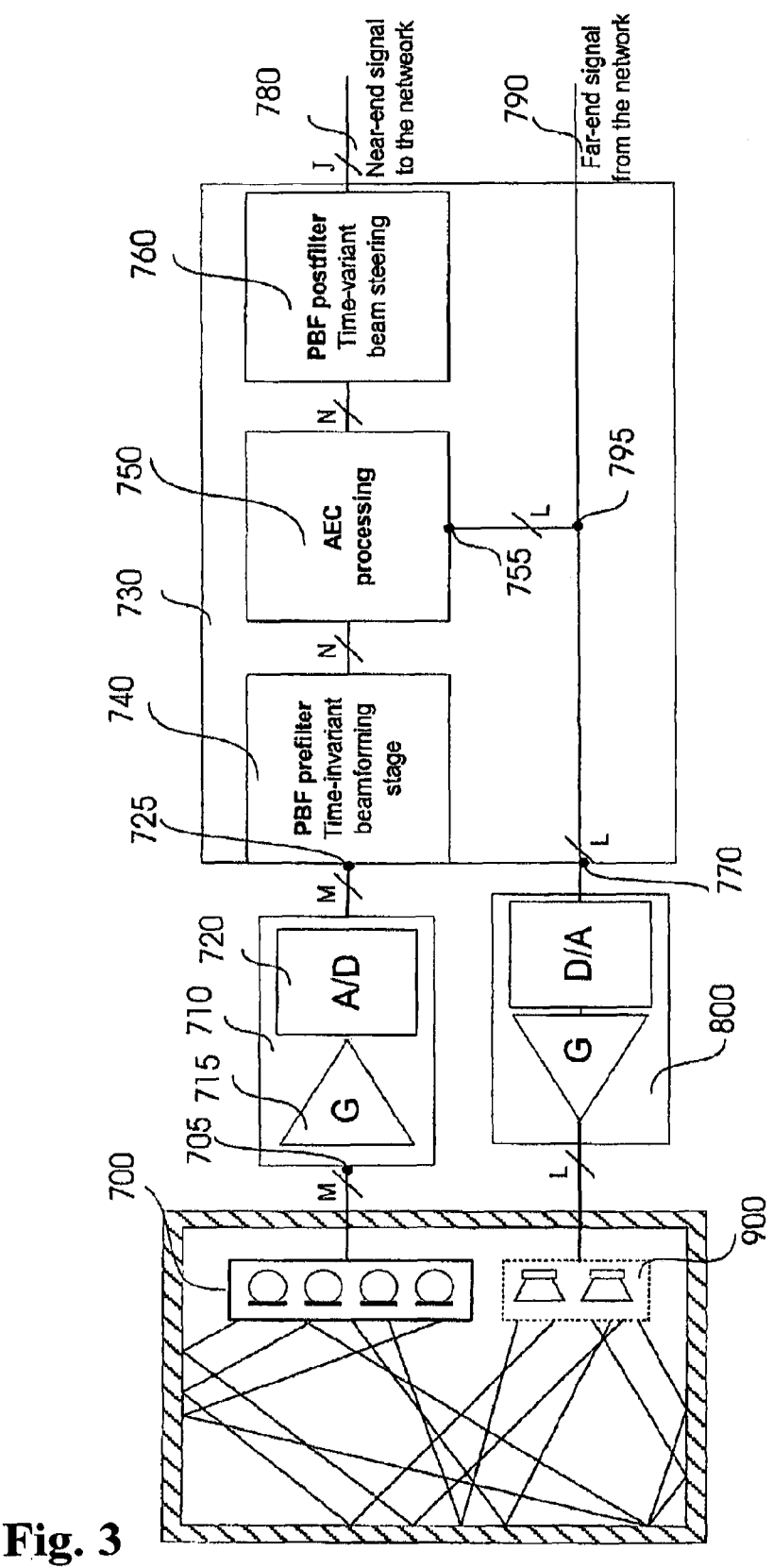
FIG. 3 a beamforming system according to a first embodiment of the invention.

FIG. 3 shows a Beamforming system of the invention. In a mobile terminal device typically a processing unit, for example a signal processor and memory unit are prepared for providing an acoustic echo cancellation and a microphone beamforming. There are one or a plurality of microphones 700. At an input side, a pre-processing stage 710 comprises an amplifier 715 for amplifying an audio signal and a signal converter 720 for an analog-to-digital conversion.

Said acoustic echo cancellation and a microphone beamforming are performing within a main signal processing stage 730. In stage 730, a pre-filter for polynomial beamforming 740, an acoustic echo cancellation stage 750 and a post-filter for polynomial beamforming 760 are provided as components, for example by using a bus of N channels, or a function having an Index for addressing N channels. There may be individual feedback loops for each component, including inverter or scaling blocks.

Also, at an output side, a loudspeaker system processing stage 800 may comprise an amplifier 715 and a signal converter 720 for a digital-to-analog conversion and one or a plurality of a speaker 900.

Figure 4:
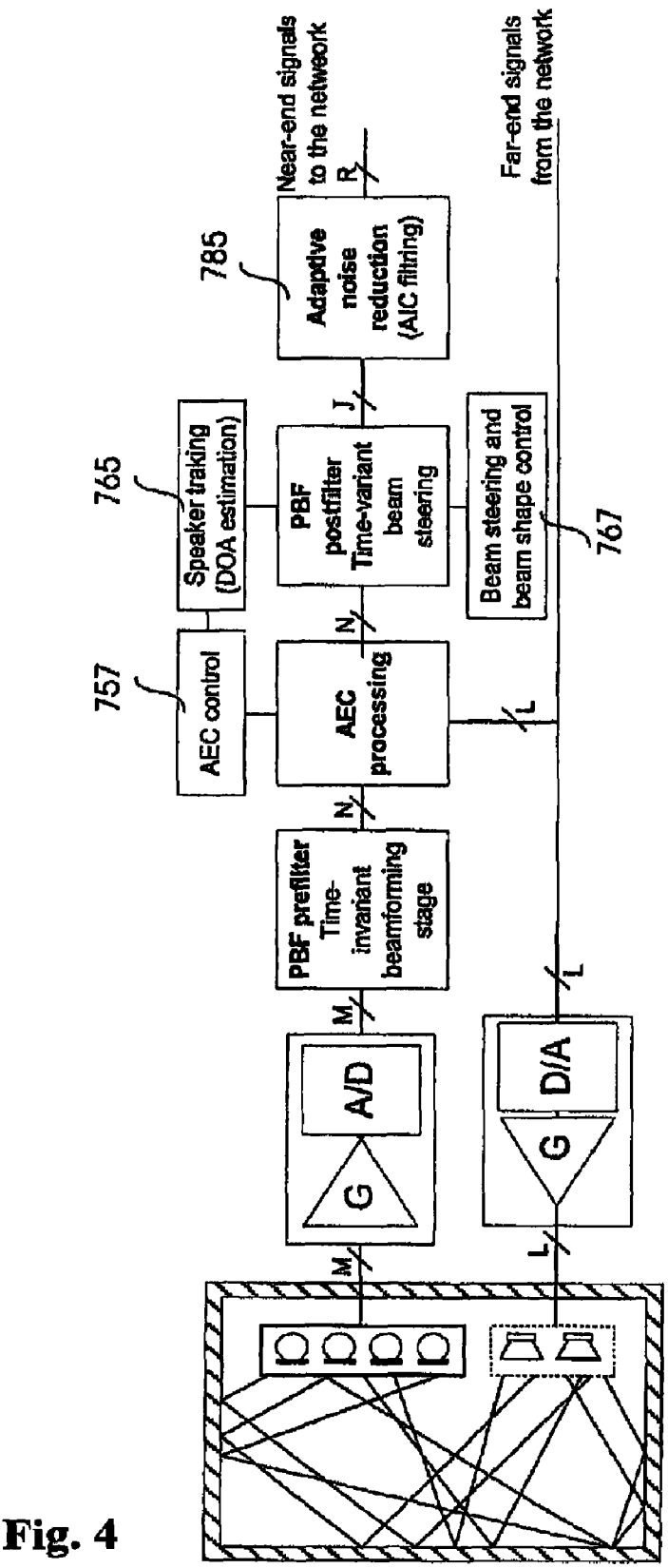
FIG. 4 a beamforming system according to a first Embodiment of the invention with associated control blocks.

In FIG. 4 additional control blocks may be associated with the main processing stage. For example, an acoustic echo cancellation control stage 757 controlling e.g. the AEC adaptation rate using a voice activity detector may be connected to said acoustic echo cancellation stage 750. Also, a speaker tracing stage 765, suitable for estimation of Direction of Arrival of a signal may be provided as well as a beam steering and beam shape control stage 767 which is connected to post-filter for polynomial beamforming 760. Furthermore an adaptive noise reduction stage 785 suitable for adaptive interference cancellation or some other noise reduction scheme such as spectral subtraction, wherein said stage 785 may be located between the output of said post-filter stage 760 and the output 780 of the main signal processing stage 730. Said stage 760 may be connected to the stage 785 by a plurality of J channels, and the stage 785 may be connected to the output 780 by a plurality of R channels. Possibly, the said adaptive noise reduction stage 785 may be arranged before any of the components in the main processing stage 730 or work in parallel with one of the components. Note further that any of components, pre-filter stage 740, audio echo cancellation stage 750 and post-filter stage 760 or said adaptive noise reduction stage 785, may be permutated in a signal flow from left to right within signal processing stage 730. Also the internal structure of the signal processing stage 730 may be changed even during runtime, including the number of processed channels, any parameters of the channel, for example bandwidth or resolution, number of processed coefficients.

The control of the MMBF-AEC system is an important factor in the overall system performance. If the audio processing flow is correct interfering signal components have been removed from the signals before the audio processing control takes place. In addition to the mentioned benefits of the AEC control the above configuration provides clear benefits in enabling e.g. speaker tracking control after the echo signal has been removed from the audio signals. The proper suppression of the strong interfering echo signals simplify the control logic and improve the CPU efficiency. Multiple parallel AEC filters can also share the same AEC control logic without multiplication of the AEC control load. In general digital signal processors are very efficient in running FIR filters in comparison to running conditional execution logic that is typical in a control code. In a practical implementation the execution of multiple parallel adaptive AEC filter stages with moderate filter lengths may be relatively cost efficient compared to more complicated control code needed to overcome the beam steering interferences caused by the 'beamformer first' configuration. True benefits will be dependent on the final system configuration and required system performance.

Figure 5:
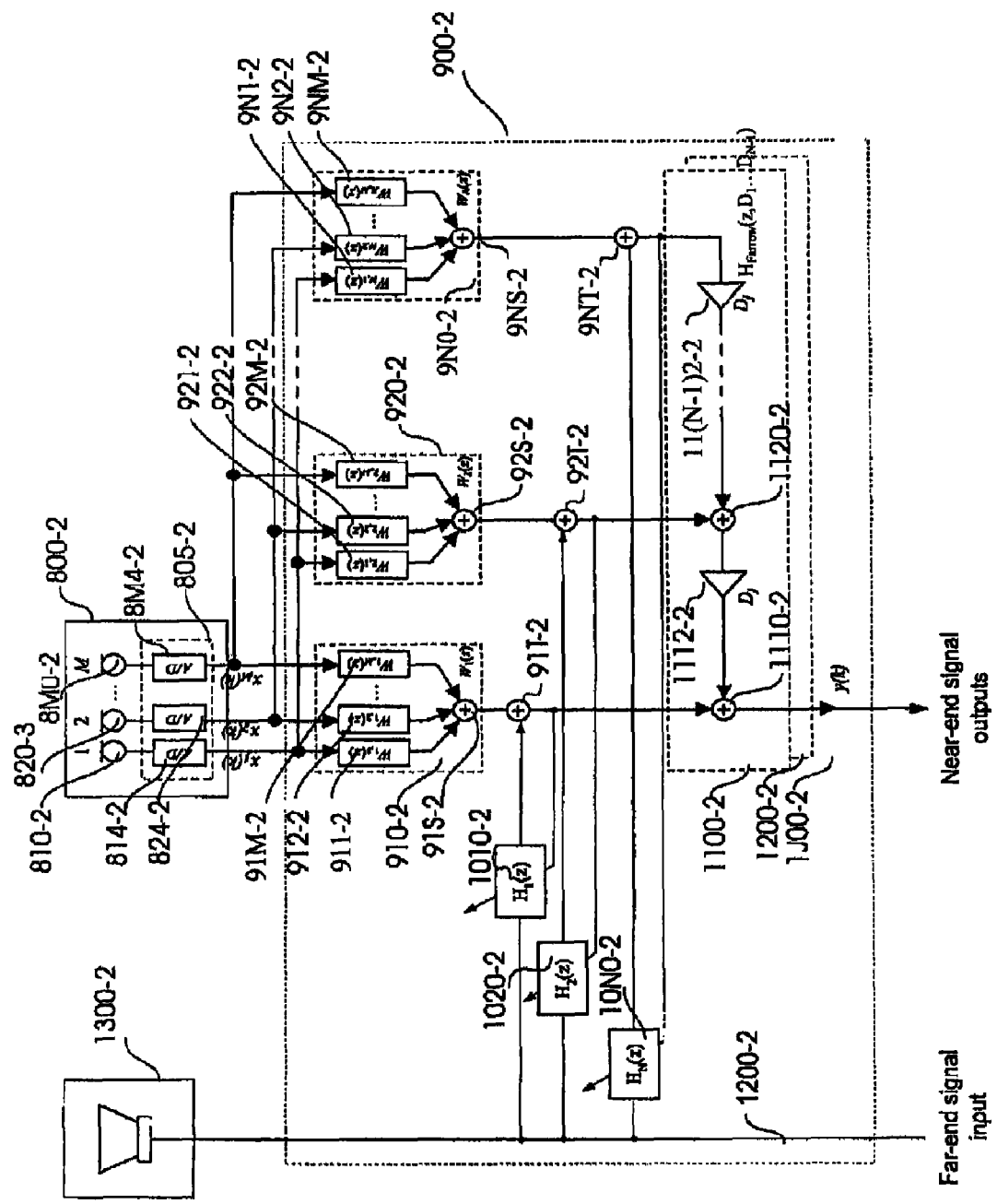
FIG. 5 an AEC integration to time-varying PBF beamformer front-end with multiple output beams according to a second embodiment of the invention.

In FIG. 5 a proposed AEC integration to time-varying PBF beamformer front-end with multiple output beams is shown according to a second embodiment of the present invention.

Note that all reference signs have a "-2" at the end, according to the second embodiment, but the here a plurality of parallel post-filters is present e.g. for the tracking of multiple dynamic sources. For the rest the same components are used as shown in FIG. 2.

Figure 6:
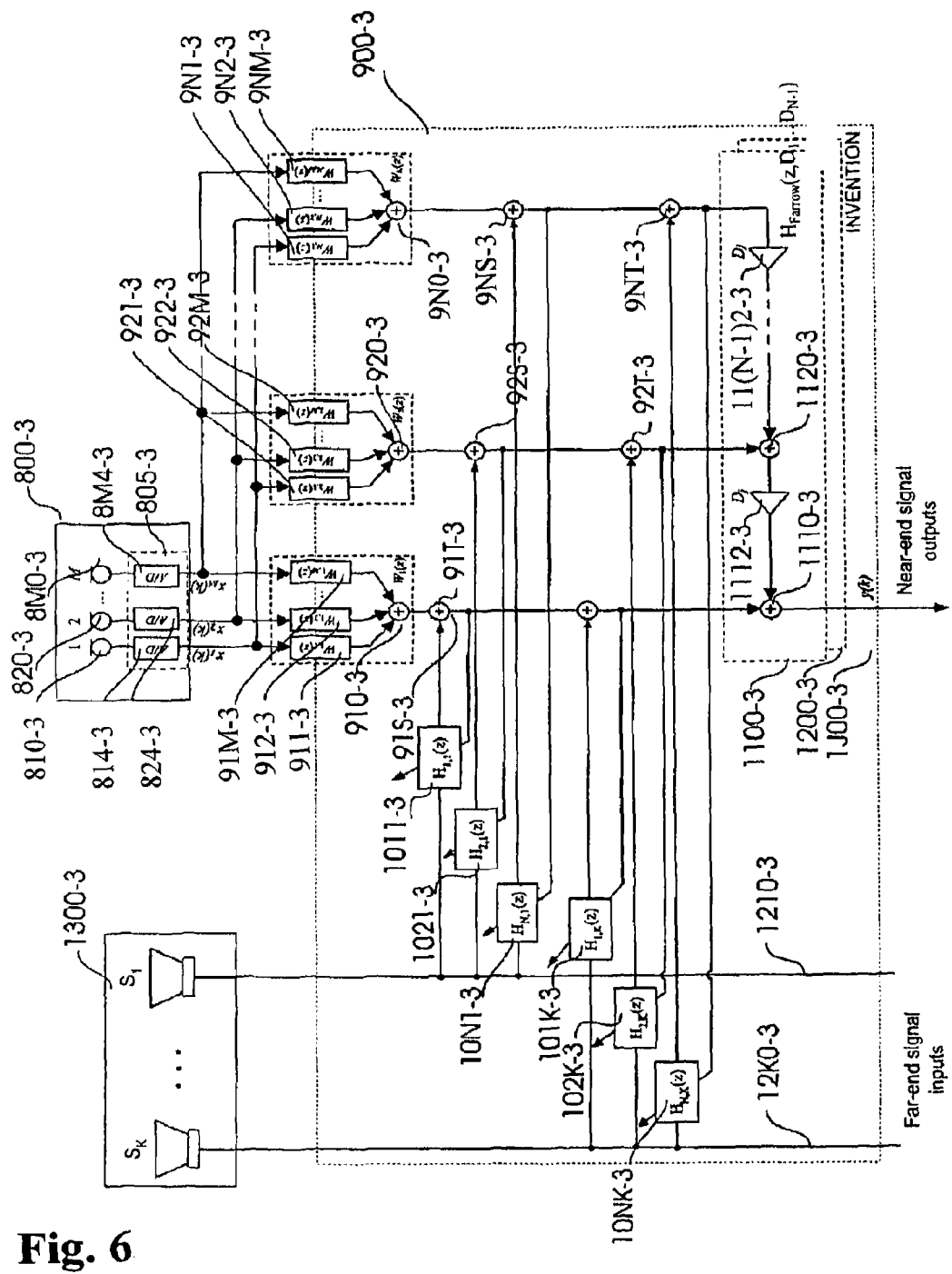
FIG. 6 an AEC integration to time-varying PBF beamformer front-end with multiple loudspeakers and multiple output beams according to a third embodiment of the invention.

According to FIG. 6 a third embodiment for a proposed AEC integration to time-varying PBF beamformer front-end with multiple loudspeakers and multiple output beams is shown. This MIMO implementation calls for multi-channel echo cancellation methods known in the art. All reference signs have a "-3" at the end, according to the third second embodiment, for the rest the same components are used as shown in FIG. 2.

Figure 7:
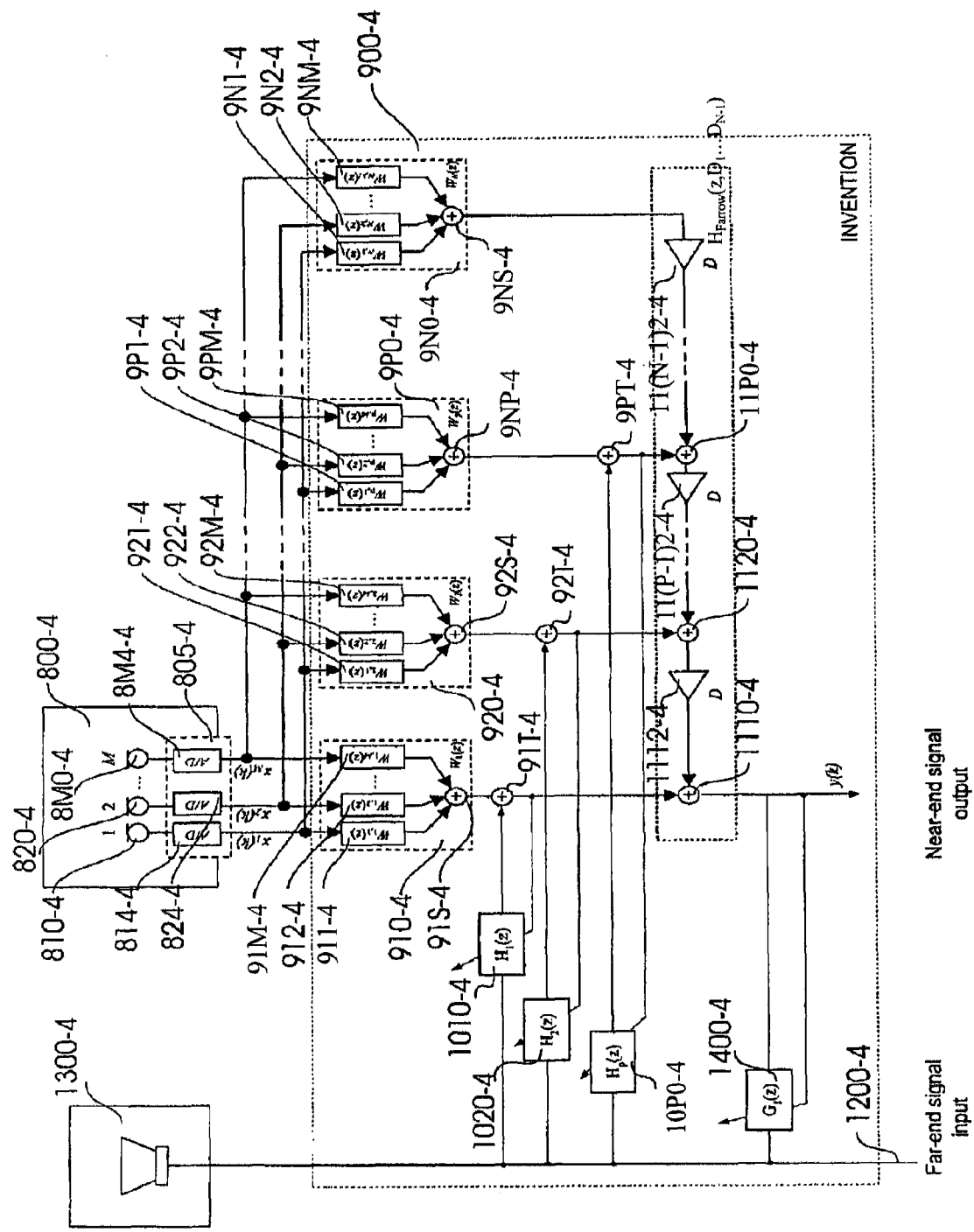
FIG. 7 a system according to a fourth embodiment which integrates AEC with time-varying PBF beamformer with partitioned AEC structure.

In FIG. 7, the fourth embodiment integrates AEC with a time-varying PBF beamformer with partitioned AEC structure. In this embodiment AEC filters $H_i(z)$ are independent of the beam steering and $G(z)$ is not. With this configuration the total number of AEC filters can be reduced so that steering independent AECs $H_i(z)$ will take care of the dominant echo components and the AEC filter(s) $G(z)$ will attenuate the residual echo leakage from the steering independent AECs $H_i(z)$ as well as the unattenuated echo from the pre-filter output channels (intermediate signal) without a dedicated AEC block. Said fourth embodiment can also be extended for multiple beams and output signals (see FIG. 4) and multiple loudspeakers (MIMO configuration) (see the fifth embodiment in FIG. 8).

Figure 8:
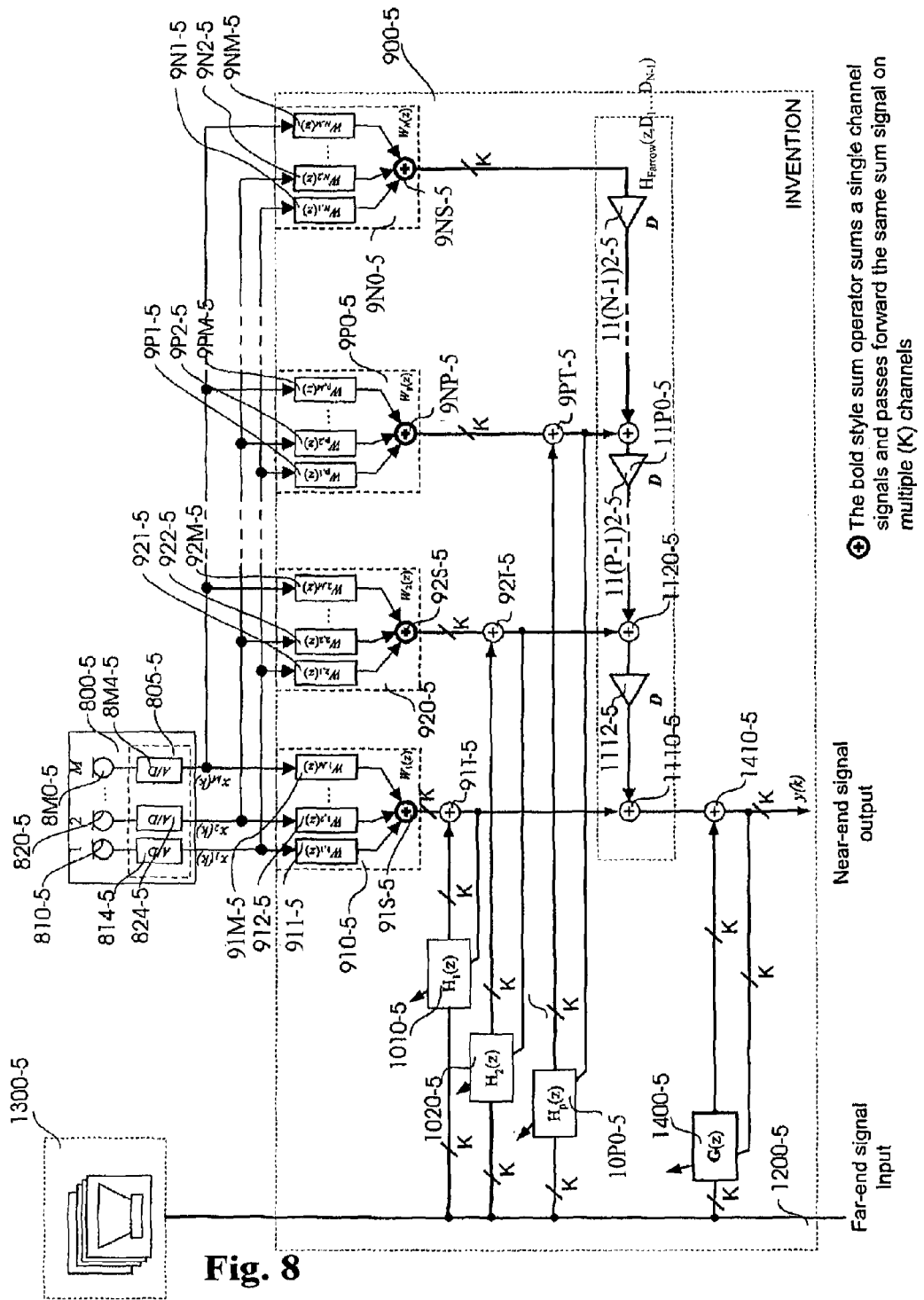
FIG. 8 a fifth embodiment of the present invention which is an extension of said fourth embodiment with multi-channel MIMO configuration.
Figure 9:
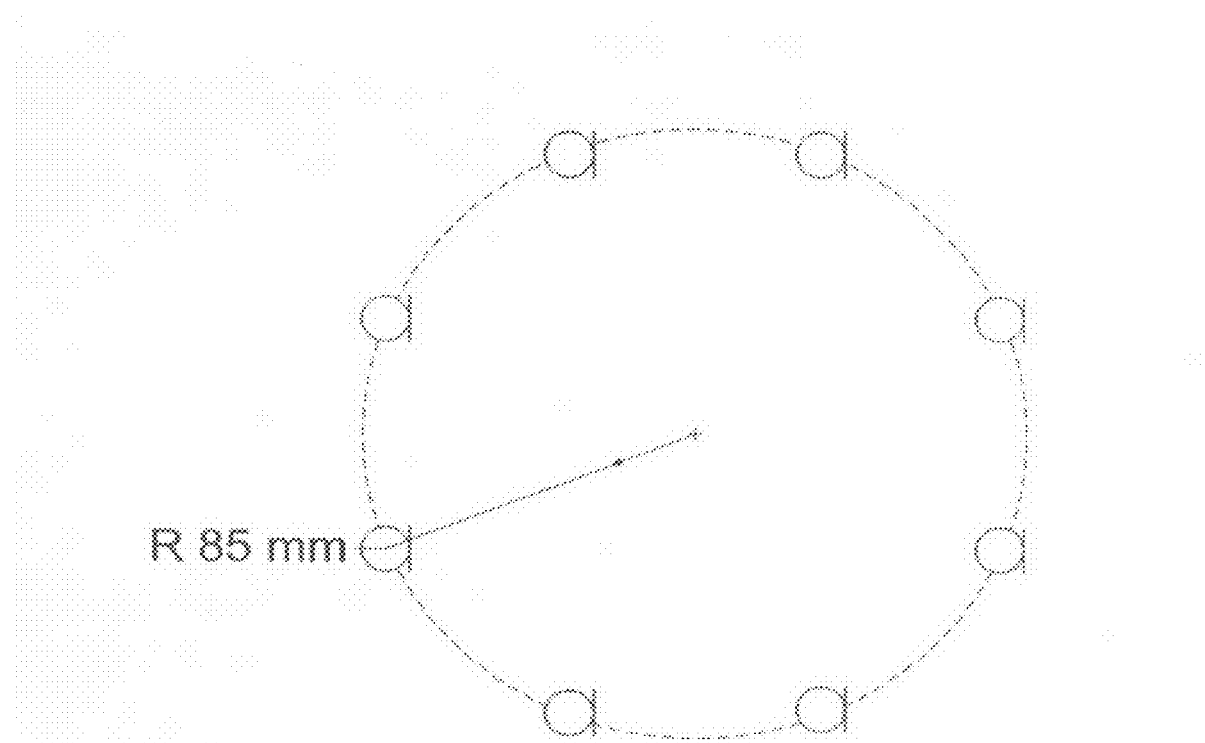
FIG. 9 example of a 8 microphone 2D circular array with a diameter of 170 mm, beam pattern responses $W_i(z)$ for this array configuration are illustrated in the following five figures (FIG. 10 to FIG. 14)
Figure 10:
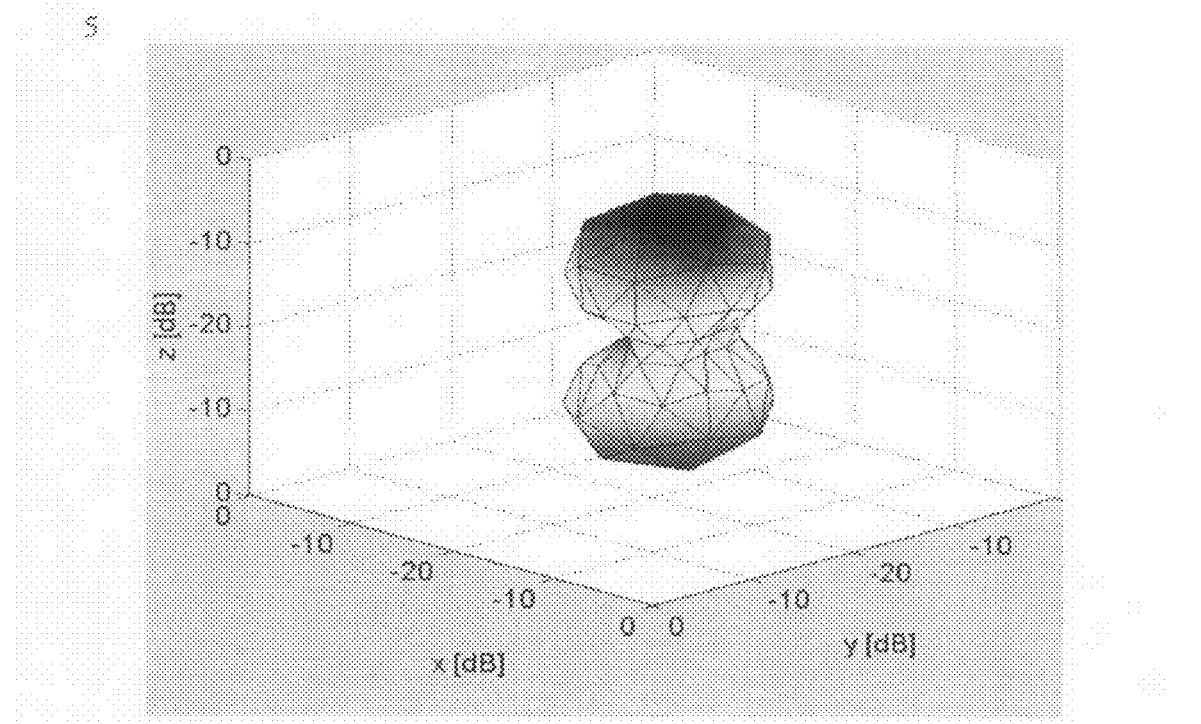
FIG. 10 an example of a beam pattern $W_1(z)$ in connection with the present invention at 2100 Hz, (0th order term of the PBF pre-filter designed with Chebyshev polynomials)
Figure 11:
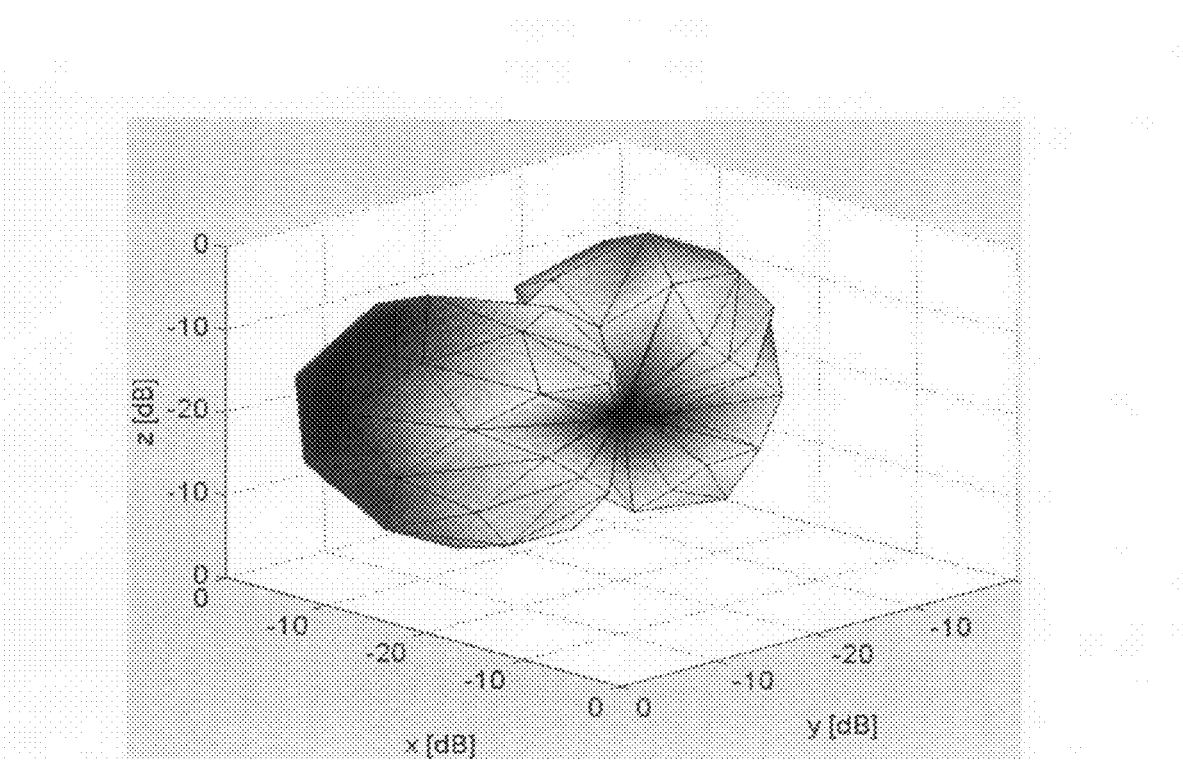
FIG. 11 an example of a beam pattern $W_2(z)$ at 2100 Hz, (1st order term of the PBF pre-filter with Chebyshev polynomials)
Figure 12:
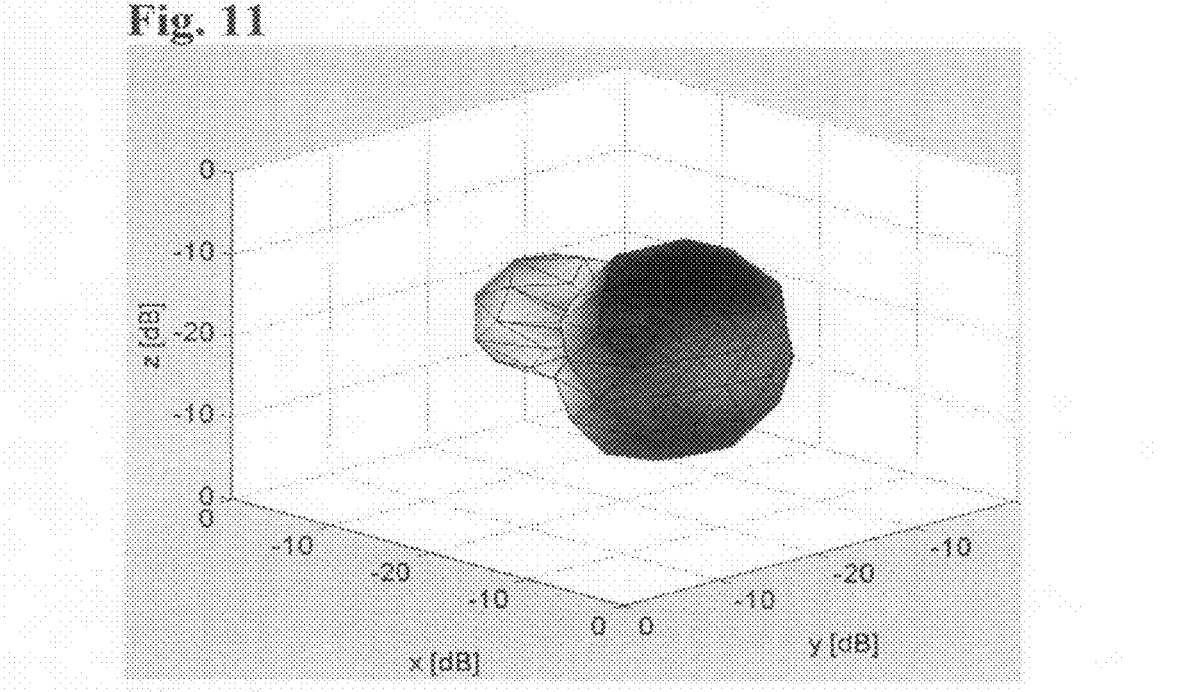
FIG. 12 an example of a beam pattern $W_3(z)$ at 2100 Hz, (2nd order term of the PBF pre-filter with Chebyshev polynomials)
Figure 13:
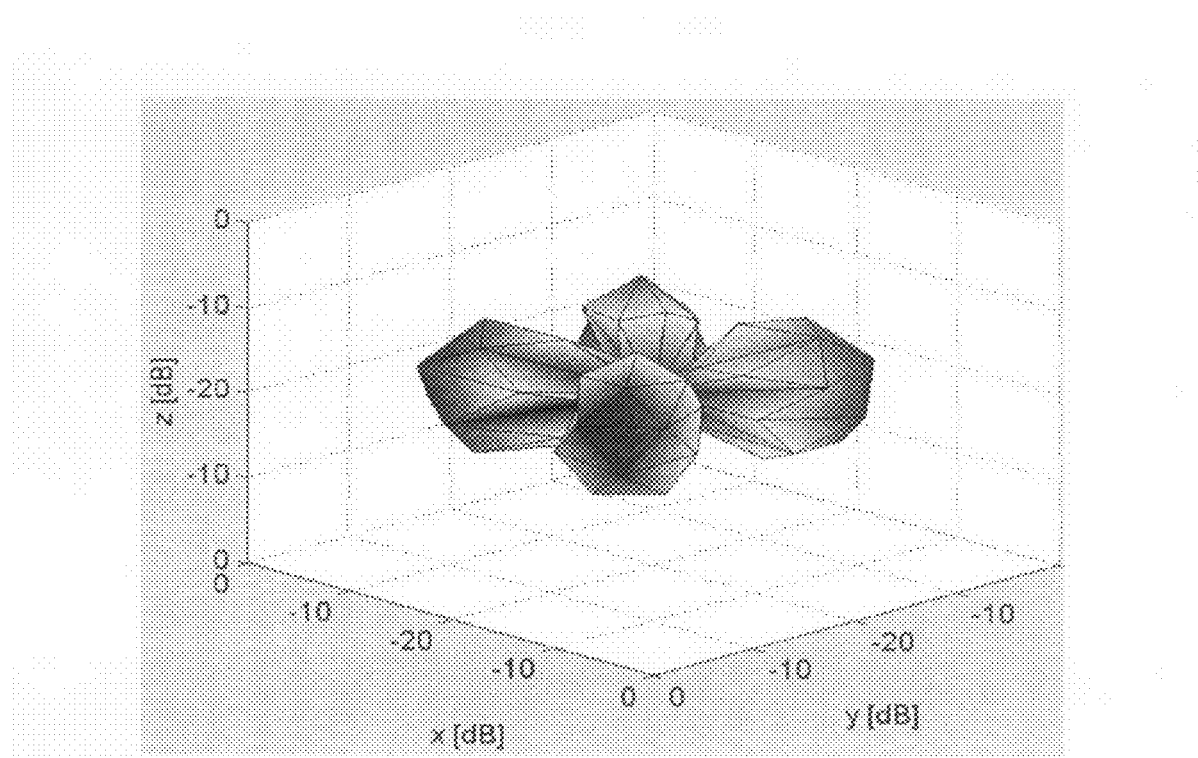
FIG. 13 an example of a beam pattern $W_4(z)$ at 2100 Hz, (3rd order term of the PBF pre-filter with Chebyshev polynomials)
Figure 14:
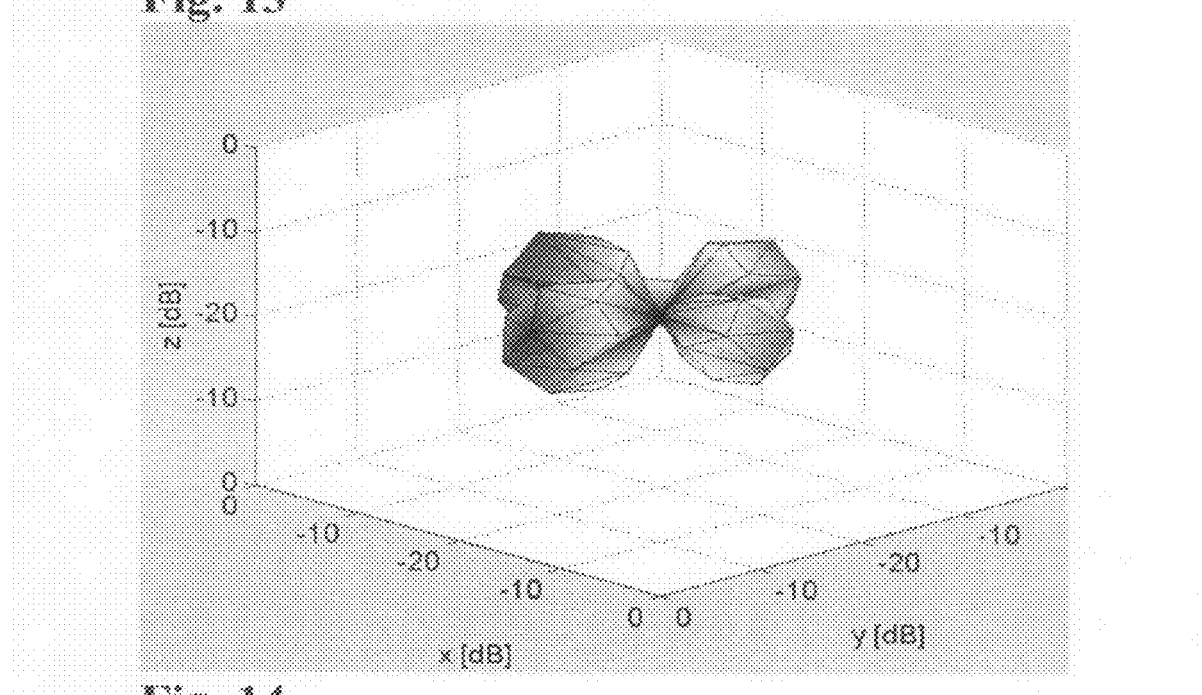
FIG. 14 an example of a beam pattern $W_5(z)$ at 2100 Hz, (4th order term of the PBF pre-filter with Chebyshev polynomials)

This embodiment can also be extended for multiple beams and output signals (see FIG. 5) and multiple loudspeakers (MIMO configuration) (see next Embodiment in FIG. 8). All reference signs have a "-4" at the end, according to the fourth second embodiment, for the rest the same components are used as shown in FIG. 2.

FIG. 8 shows a fifth Embodiment which is an extension of the fourth embodiment with multi-channel MIMO configuration. Respective reference signs have a "-5" at the end, according to the fifth second embodiment, for the rest the same components are used as shown in FIG. 5.

ADVANTAGES OF THE INVENTION

One advantage of this invention is to provide an efficient implementation for the steering independent MMBF-AEC integration.

Significant improvements in the CPU efficiency can be achieved compared to other known integrated time variant beamforming and AEC configurations, where the most relevant reference system is the traditional 'AEC first' configuration.

CPU Advantages compared to the most relevant reference configuration 'AEC first':

When the number of intermediate signals is smaller than the number of microphones (N<M) AEC filtering stages are needed to provide steering independent AEC functionality compared to steering independent 'AEC first' configuration. The number of intermediate signals is dependent on the order of the steering polynomial of the PBF, which is independent of the microphone number. As an example first order differential beam pattern supporting full 3D steering can be constructed with four intermediate signals having orthogonal pre-filter beams. If the steering angle is reduced into half-space or a 2D plane the total number of required intermediate signal and N can be further reduced.

A design example with eight microphones (M=8) and fourth order Chebyshev beam steering filter (N=5) is illustrated in FIGS. 9-15. Similarly it would be possible to construct e.g. microphone array with M=64 microphones with the same (N=5) amount intermediate signals. In this type of use the computational saving of the invention compared to 'AEC first' configuration become very significant.

The increase in the polynomial order can be utilized in more accurate polynomial approximation of the ideal Filter-and-Sum beamforming (FSB) filter coefficient. The PBF filter structure used in this invention is known from the prior art (see Kajala M. and Hämäläinen M., System and method for processing a signal being emitted from a target signal source into a noisy environment. European patent EP1184676 granted Jun. 5, 2004).

The beam pattern of the pre-filter $W_i(z)$ may enable direction dependent AEC control, because different pre-filters have different directivity patterns and therefore the echo coupling factors may be also dependent of the directivity of the pre-filter. The residual echo levels would be weighted according to the beamformer's beam pattern enabling direction dependent AEC control.

Post-filtering may also attenuate the residual echo level due to the summation of multiple incoherent residual echo signals present in the input signals of the post-filter.

Separate AEC filters with different echo coupling levels can be adjusted for having different AEC filter lengths. This can be justified because direct sound coupling can be designed—a priori—in the PBF filter design. If one of the AEC filter's has e.g. 10 to 15 dB higher echo levels due to the coupling of the direct sound, the AEC filter adaptation can be tuned to concentrate on the direct sound attenuation where are other filters can be tuned to concentrate on room reverberation. The implementation with a shortened AEC for the direct sound can be configured quite easily with the partitioned AEC structure Also other type of AEC networks can be configured to reduce the AEC complexity. The PBF filter using Taylor polynomials has a very simple post-filter processing network, but with high order polynomial approximation the pre-filter coefficients may become numerically undesirably large and the polynomial approximation errors may grow large between the interpolation points. These characteristics are well known for Taylor polynomials and Lagrange interpolation in the mathematics literature. Chebyshev polynomials have the advantage of being bounded between [−1,+1] and their approximation error is spreads out smoothly over the approximation interval. This makes Chebyshev polynomial approximation a very suitable for PBF application.

The invention can be implemented in the frequency domain as well as with subband processing utilizing filter banks. These both could be very feasible implementations especially for wide band beamforming systems (no illustrative figures available yet).

It is possible to integrate speaker tracking functionality to the intermediate signals after the AEC processing. This has the advantage of being more robust against the disturbances cause by the echo signal from the loudspeaker. In the current implementation strong echo reflections can cause speaker tracker algorithm to turn towards the reflected echo sound, which could cause severe artifacts especially during the double talk. Applicant has IPR on such PBF based speaker tracking algorithm (no illustrative figures available yet).

The PBF beamforming filter structure is protected by Applicant's IPR portfolio (see Kajala M. and Hämäläinen M., System and method for processing a signal being emitted from a target signal source into a noisy environment. European patent EP1184676 granted Jun. 5, 2004). This invention provides an integral solution for Applicant's MMBF system solution for high performance MMBF system solutions.

The present invention is not limited by the AEC technology. The same MMBF-AEC functionality can be implemented with many different AEC technologies e.g. in time domain, frequency domain, lapped transform domain, or sub-bands of a filter bank.

In the lowest cost implementations the product HW may already have CPU power to process only one channel AEC. In this case the CPU benefit from this invention is already neutral. In this configuration the AEC may interact with beam steering and the AEC processing may be assembled either after the beamformer ('beamformer first' configuration) or in parallel with the beamformer (GEIC). Therefore the benefits are already neutral in the lowest complexity implementations.

LIST OF ABBREVIATIONS

ABM—Adaptive Blocking Matrix
AEC—Acoustic Echo Cancellation
AIC—Acoustic Interference Cancellation
DOA—Direction Of Arrival
FBF—Fixed Beamforming Filter
FSB—Filter-and-sum beamformer
GEIC—Generalized Echo and Interference Canceller
GSC—Generalized Sidelobe Canceller
MMBF—Multi-Microphone Beamforming
PBF—Polynomial Beamforming Filter

The invention claimed is:

1. A device comprising:
a pre-filter for polynomial beamforming, wherein the pre-filter comprises a plurality of finite impulse response filters that do not change an echo path of a signal;
an acoustic echo cancellation stage for reducing echo, wherein the acoustic echo cancellation stage comprises a plurality of processing blocks each of which is operable to perform acoustic echo cancellation by applying an acoustic echo cancellation function based on an audio signal that is to be output via at least one speaker; and
a post-filter for polynomial beamforming, wherein the post-filter is operable to apply a beam steering processing function, wherein the acoustic echo cancellation stage operates after the pre-filter and before the post-filter, wherein the pre-filter, the acoustic echo cancellation stage and the post-filter are located within a signal processing stage of the device.

2. The device according to claim 1, wherein said signal processing stage comprises a time-invariant beamforming stage.

3. The device according to claim 1, wherein said device comprises a time-variant beamforming stage.

4. The device according to claim 1, wherein said pre-filter is time-invariant and is suitable for time-invariant beamforming and wherein said post-filter is time-variant and is suitable for time-variant beam steering.

5. The device according to claim 1, further comprising: a plurality of microphones operable to receive an acoustic signal using microphone beamforming.

6. The device according to claim 5, further comprising: a pre-processing stage comprising a plurality of analog-to-digital signal converters, wherein the pre-processing stage is connected to the plurality of microphones and the main-signal processing stage.

7. The device according to claim 6, wherein the pre-processing stage further comprises a plurality of amplifiers.

8. The device according to claim 1, further comprising:
a loudspeaker system processing stage comprising at least one amplifier and at least one digital-to-analog signal converter; and
the least one speaker, wherein the at least one speaker is connected to the loudspeaker system processing stage.

9. The device according to claim 1, wherein the polynomial beamforming performed by the pre-filter and polynomial beamforming performed by the post-filter apply polynomial basis functions based on Chebyshev polynomials.

10. The device according to claim 1, wherein each finite impulse response filter of the pre-filter has a dedicated beam pattern, wherein the post-filter is operable to achieve an overall beam pattern of the polynomial beamforming for a desired beam steering direction.

11. The device according to claim 1, further comprising: an acoustic echo cancellation controller connected to the acoustic echo cancellation stage and operable to control an acoustic echo cancellation adaptation rate using a voice activity detector.

12. The device according to claim 5, further comprising: a speaker tracing controller connected to the acoustic echo cancellation controller and the post-filter, wherein the speaker tracing controller is operable to estimate direction of arrival of the received acoustic signal.

13. The device according to claim 1, further comprising: a beam steering and beam shape controller connected to the post-filter.

14. The device according to claim 1, further comprising: an adaptive noise reduction stage operable to perform adaptive interference cancellation.

15. The device according to claim 1, wherein the post-filter comprises a plurality of parallel post-filter stages operable to track multiple dynamic sources.

16. The device according to claim 1, wherein the at least one speaker comprises a plurality of speakers, wherein the audio signal that is to be output via the plurality of speakers comprises a multiple-input multiple output audio signal, wherein the acoustic echo cancellation stage is operable to perform multi-channel echo cancellation.

17. The device according to claim 1, wherein the plurality of processing blocks of the acoustic echo cancellation stage comprise a plurality of first processing blocks that are independent of the beam steering processing function applied by the post-filter, wherein the acoustic echo cancellation stage further comprises at least one second processing block that is not independent of the beam steering processing function applied by the post-filter.

18. The device according to claim 17, wherein the plurality of first processing blocks operate on dominant echo components, wherein the at least one second processing block operates on residual echo leakage from the plurality of first processing blocks, wherein the at least one second processing block further operates on unattenuated echo from the plurality of third outputs.

19. The device according to claim 17, wherein the plurality of processing blocks of the acoustic echo cancellation stage comprise a plurality of first processing blocks that are independent of the beam steering processing function applied by the post-filter, wherein the acoustic echo cancellation stage further comprises at least one second processing block that is not independent of the beam steering processing function applied by the post-filter.

20. The device according to claim 1, wherein the acoustic echo cancellation stage operates on at least one output of the pre-filter and provides at least one input for the post-filter.

21. The device according to claim 1, wherein the device comprises a mobile device.

22. The device according to claim 1, wherein the device comprises a mobile terminal device.

23. The device according to claim 1, wherein the device comprises a mobile communication device.

24. The device according to claim 6, wherein said plurality of microphones comprises an array of microphones that is connected to M input-channels of said pre-processing stage, wherein said pre-processing stage has M output-channels connected to N input-channels of said signal processing stage.

25. The device according to claim 24, wherein said signal processing stage has J output-channels which are connected to J input-channels of a network.

26. A device comprising: a plurality of processing blocks each of which is operable to perform acoustic echo cancellation by applying an acoustic echo cancellation function based on an audio signal that is to be output via at least one speaker, wherein the plurality of processing blocks are located within an acoustic echo cancellation stage that operates after a pre-filter and before a post-filter, wherein the pre-filter is for polynomial beamforming and does not change an echo path of a signal on which the pre-filter operates, wherein the post-filter is for polynomial beamforming and applies a beam steering processing function.

27. The device according to claim 26, wherein said pre-filter is time-invariant and is suitable for time-invariant beamforming and wherein said post-filter is time-variant and is suitable for time-variant beam steering.

28. The device according to claim 26, wherein the polynomial beamforming performed by the pre-filter and polynomial beamforming performed by the post-filter apply polynomial basis functions based on Chebyshev polynomials.

29. The device according to claim 26, further comprising: an acoustic echo cancellation controller connected to the acoustic echo cancellation stage and operable to control an acoustic echo cancellation adaptation rate using a voice activity detector.

30. The device according to claim 26, further comprising: a speaker tracing controller connected to the acoustic echo cancellation controller and the post-filter, wherein the speaker tracing controller is operable to estimate direction of arrival of the received acoustic signal.

31. The device according to claim 26, wherein the at least one speaker comprises a plurality of speakers, wherein the audio signal that is to be output via the plurality of speakers comprises a multiple-input multiple output audio signal, wherein the acoustic echo cancellation stage is operable to perform multi-channel echo cancellation.

32. The device according to claim 26, wherein the plurality of processing blocks of the acoustic echo cancellation stage comprise a plurality of first processing blocks that are independent of the beam steering processing function applied by the post-filter, wherein the acoustic echo cancellation stage further comprises at least one second processing block that is not independent of the beam steering processing function applied by the post-filter.

33. The device according to claim 32, wherein the plurality of first processing blocks operate on dominant echo components, wherein the at least one second processing block operates on residual echo leakage from the plurality of first processing blocks, wherein the at least one second processing block further operates on unattenuated echo from the plurality of third outputs.

34. The device according to claim 32, wherein the plurality of processing blocks of the acoustic echo cancellation stage comprise a plurality of first processing blocks that are independent of the beam steering processing function applied by the post-filter, wherein the acoustic echo cancellation stage further comprises at least one second processing block that is not independent of the beam steering processing function applied by the post-filter.

35. The device according to claim 26, wherein the acoustic echo cancellation stage operates on at least one output of the pre-filter and provides at least one input for the post-filter.

36. The device according to claim 26, wherein the device is embodied in a mobile device.

37. The device according to claim 26, wherein the device is embodied in a mobile terminal device.

38. The device according to claim 26, wherein the device is embodied in a mobile communication device.

\* \* \* \* \*